(12) United States Patent
Jiang et al.

(10) Patent No.: US 12,246,393 B2
(45) Date of Patent: Mar. 11, 2025

(54) FEMTOSECOND LASER SYSTEM FOR PROCESSING MICRO-HOLE ARRAY

(71) Applicant: Tsinghua University, Beijing (CN)

(72) Inventors: Lan Jiang, Beijing (CN); Jianfeng Yan, Beijing (CN); Jiaqun Li, Beijing (CN)

(73) Assignee: Tsinghua University, Beijing (CN)

( * ) Notice: Subject to any disclaimer, the term of this patent is extended or adjusted under 35 U.S.C. 154(b) by 660 days.

(21) Appl. No.: 17/489,275

(22) Filed: Sep. 29, 2021

(65) Prior Publication Data

US 2022/0016729 A1  Jan. 20, 2022

Related U.S. Application Data

(63) Continuation of application No. PCT/CN2020/084700, filed on Apr. 14, 2020.

(30) Foreign Application Priority Data

Apr. 15, 2019 (CN) .......................... 201910299942.7

(51) Int. Cl.
| | |
|---|---|
| B23K 26/0622 | (2014.01) |
| B23K 26/06 | (2014.01) |
| B23K 26/08 | (2014.01) |
| B23K 26/382 | (2014.01) |
| B23K 26/384 | (2014.01) |

(52) U.S. Cl.
CPC ...... B23K 26/0624 (2015.10); B23K 26/0643 (2013.01); B23K 26/0648 (2013.01); B23K 26/083 (2013.01); *B23K 26/382* (2015.10); *B23K 26/384* (2015.10)

(58) Field of Classification Search
CPC ............ B23K 26/0624; B23K 26/0643; B23K 26/0648; B23K 26/083
See application file for complete search history.

(56) References Cited

U.S. PATENT DOCUMENTS

| | | | | |
|---|---|---|---|---|
| 6,452,132 | B1 * | 9/2002 | Fuse | B23K 26/066 359/569 |
| 2009/0253016 | A1 * | 10/2009 | Katayama | B01D 67/0006 429/513 |
| 2016/0368100 | A1 * | 12/2016 | Marjanovic | B23K 26/384 |

FOREIGN PATENT DOCUMENTS

| | | | | |
|---|---|---|---|---|
| CN | 104625420 | A * | 5/2015 | ......... B26K 26/0861 |
| CN | 105728945 | A * | 7/2016 | ......... B23K 26/0622 |
| CN | 106735874 | | 5/2017 | |
| CN | 106735874 | B * | 5/2018 | ......... B23K 26/0624 |

(Continued)

OTHER PUBLICATIONS

CNIPA, First Office Action for CN Application No. 201910299942. 7, Apr. 26, 2020.

(Continued)

*Primary Examiner* — John J Norton
*Assistant Examiner* — Theodore J Evangelista
(74) *Attorney, Agent, or Firm* — Hodgson Russ LLP

(57) ABSTRACT

Provided is a femtosecond laser system for processing a micro-hole array, comprising: a femtosecond laser, a half-wave plate, a polarizer, a concave lens, a convex lens, a diaphragm, a mechanical shutter, a phase-type spatial light modulator, a first plano-convex lens, a reflecting mirror, a second plano-convex lens, a dichroic mirror, a camera, a processing objective lens, a six-axis translation stage and a transmissive white light source.

8 Claims, 3 Drawing Sheets

(56) References Cited

FOREIGN PATENT DOCUMENTS

| | | | | |
|---|---|---|---|---|
| CN | 108723586 | | 11/2018 | |
| CN | 110238546 | | 9/2019 | |
| JP | 2006239718 A | * | 9/2006 | ......... B23K 26/0624 |
| KR | 20130072713 A | * | 7/2013 | ........... B23K 26/073 |

OTHER PUBLICATIONS

WIPO, International Search Report and Written Opinion for International Application No. PCT/CN2020/084700, Jul. 9, 2020.

* cited by examiner

FEMTOSECOND LASER SYSTEM FOR PROCESSING MICRO-HOLE ARRAY

CROSS-REFERENCE TO RELATED APPLICATIONS

This application is a continuation of International Application No. PCT/CN2020/084700, filed on Apr. 14, 2020, which claims priority to and benefits of Chinese Patent Application No. 201910299942.7, filed on Apr. 15, 2019, the entire contents of which are incorporated by reference herein.

FIELD

The present disclosure relates to a field of laser applications, and more particularly to a femtosecond laser system for processing a micro-hole array.

BACKGROUND

In recent years, laser is applied to various fields such as micro sensor manufacturing, micro-chip packaging, and micro-hole array processing. The micro-hole array may have micro-holes being of different shapes and numbers. The micro-holes in the array have high requirements on precision and quality, such as size, morphology, depth-to-diameter ratio, and the process of the micro-hole array needs a high overall processing efficiency. With existing processing methods, such as micro-EDM, electrochemistry and micro-drilling, the micro-hole array may have poor uniformity due to unevenly distributed energy and low processing efficiency. Therefore, there is still a need to provide a system which is capable of processing a micro-hole array of high quality and large area in a low cost and high efficiency way.

SUMMARY

Embodiments of the present disclosure seek to solve at least one of the problems existing in the related art to at least some extent.

The present disclosure provides in embodiments a femtosecond laser system for processing a micro-hole array. The system includes: a femtosecond laser, a half-wave plate, a polarizer, a concave lens, a convex lens, a diaphragm, a mechanical shutter, a phase-type spatial light modulator, a first plano-convex lens, a reflecting mirror, a second plano-convex lens, a dichroic mirror, a camera, a processing objective lens, a six-axis translation stage and a transmissive white light source. The femtosecond laser, the half-wave plate, the polarizer, the concave lens, the convex lens, the diaphragm and the mechanical shutter are sequentially arranged on a first optical axis. The mechanical shutter is configured to control a femtosecond laser beam to be incident on the phase-type spatial light modulator to generate a spatially shaped femtosecond laser pulse. The spatially shaped femtosecond laser pulse sequentially passes through the first plano-convex lens, the reflecting mirror, the second plano-convex lens and the dichroic mirror to reach the processing objective lens, and is focused by the processing objective lens to be irradiated on a sample to be processed on the six-axis translation stage to form the micro-hole array for the sample. The half-wave plate and the polarizer together constitute an energy adjustment system for adjusting energy of the femtosecond laser and making a polarization direction of the emitted femtosecond laser beam horizontal. The phase-type spatial light modulator is configured to perform phase modulation to the femtosecond laser beam according to a phase diagram of the micro-hole array of the sample. The concave lens, the convex lens and the diaphragm together constitute a beam expansion system for adjusting a beam waist diameter of the laser beam, where a front focus of the concave lens and a front focus of the convex lens coincide with each other. The dichroic mirror, the camera located at one side of the dichroic mirror, and the transmissive white light source constitute a front imaging unit for acquiring an image of the micro-hole array processed by the femtosecond laser. The phase-type spatial light modulator, the first plano-convex lens, the second plano-convex lens, and the processing objective lens together constitute a 4F system, and the 4F system is configured to prevent diffraction effect from happening in a light field modulated by the phase-type spatial light modulator before reaching the processing objective lens, wherein a focal length of the first plano-convex lens is the same as that of the second plano-convex lens, a distance between the first plano-convex lens and the second plano-convex lens is twice as long as the focal length, a distance between the first plano-convex lens and a liquid crystal screen of the phase-type spatial light modulator is equal to the focal length, and a distance between the second plano-convex lens and the processing objective lens is equal to the focal length.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
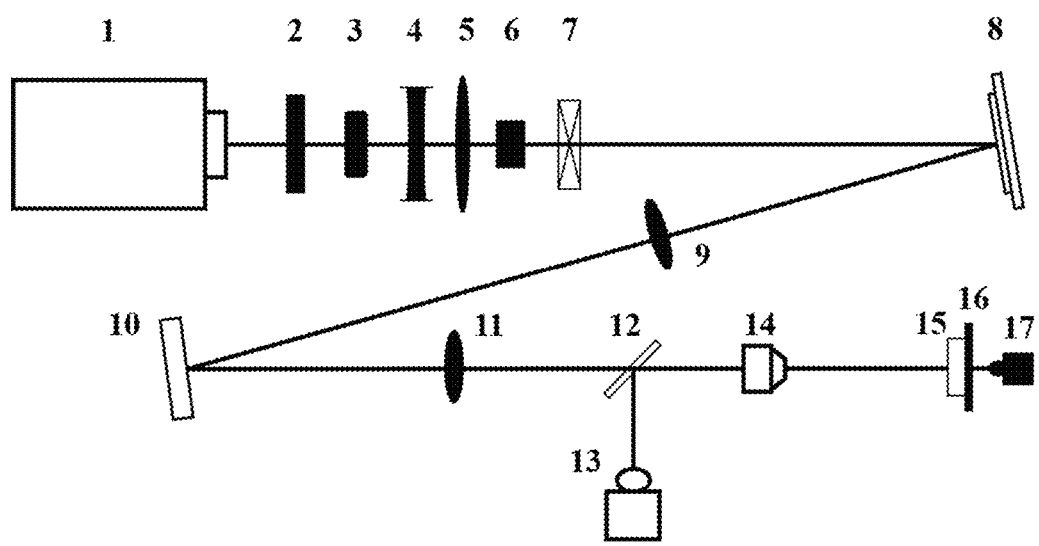
FIG. 1 is a schematic diagram showing a femtosecond laser system for processing a micro-hole array according to an embodiment of the present disclosure.

REFERENCE NUMERALS femtosecond laser 1, half-wave plate 2, polarizer 3, concave lens 4, convex lens 5, diaphragm 6, mechanical shutter 7, phase-type spatial light modulator 8, first plano-convex lens 9, reflecting mirror 10, second plano-convex lens 11, dichroic mirror 12, industry-grade CCD 13, processing objective lens 14, sample to be processed 15, six-axis translation stage 16, and transmissive white light source 17.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

The present disclosure provides in embodiments a femtosecond laser system for processing a micro-hole array which is capable of realizing different needs for processing micro-hole arrays with different numbers of holes and structures by designing a phase map loaded on e.g., a liquid crystal spatial light modulator and adjusting a focal light field distribution obtained after focusing.

The present disclosure provides in embodiments a femtosecond laser system for processing a micro-hole array. The system includes: a femtosecond laser, a half-wave plate, a polarizer, a concave lens, a convex lens, a diaphragm, a mechanical shutter, a phase-type spatial light modulator, a first plano-convex lens, a reflecting mirror, a second plano-convex lens, a dichroic mirror, a camera, a processing objective lens, a six-axis translation stage and a transmissive white light source. The femtosecond laser, the half-wave plate, the polarizer, the concave lens, the convex lens, the diaphragm and the mechanical shutter are sequentially arranged on a first optical axis. The mechanical shutter is configured to control a femtosecond laser beam to be incident on the phase-type spatial light modulator to generate a spatially shaped femtosecond laser pulse. The spatially shaped femtosecond laser pulse sequentially passes through the first plano-convex lens, the reflecting mirror, the second plano-convex lens and the dichroic mirror to reach the processing objective lens, and is focused by the processing objective lens to be irradiated on a sample to be processed on the six-axis translation stage to form the micro-hole array for the sample. The half-wave plate and the polarizer together constitute an energy adjustment system for adjusting energy of the femtosecond laser and making a polarization direction of the emitted femtosecond laser beam horizontal. The phase-type spatial light modulator is configured to perform phase modulation to the femtosecond laser beam according to a phase diagram of the micro-hole array of the sample. The concave lens, the convex lens and the diaphragm together constitute a beam expansion system for adjusting a beam waist diameter of the laser beam, where a front focus of the concave lens and a front focus of the convex lens coincide with each other. The dichroic mirror, the camera located at one side of the dichroic mirror, and the transmissive white light source constitute a front imaging unit for acquiring an image of the micro-hole array processed by the femtosecond laser. The phase-type spatial light modulator, the first plano-convex lens, the second plano-convex lens, and the processing objective lens together constitute a 4F system, and the 4F system is configured to prevent diffraction effect from happening in a light field modulated by the phase-type spatial light modulator before reaching the processing objective lens, wherein a focal length of the first plano-convex lens is the same as that of the second plano-convex lens, a distance between the first plano-convex lens and the second plano-convex lens is twice as long as the focal length, a distance between the first plano-convex lens and a liquid crystal screen of the phase-type spatial light modulator is equal to the focal length, and a distance between the second plano-convex lens and the processing objective lens is equal to the focal length.

In an embodiment, the femtosecond laser is a titanium sapphire femtosecond laser.

In an embodiment, the femtosecond laser has a pulse repetition frequency of 10 to 1000 Hz.

In an embodiment, the femtosecond laser has a single pulse energy of 20 to 200 μJ.

In an embodiment, the femtosecond laser has a beam waist diameter before focusing of 4 to 12 mm.

In an embodiment, the femtosecond laser has a center wavelength of 800 nm and a pulse width of 35 fs.

In an embodiment, the camera is an industrial-grade CCD.

In the femtosecond laser system for processing the micro-hole array of the present application, the spatial light modulator is used and different phases are designed to shape a single femtosecond laser beam into a multi-beam array light field having a specific spatial distribution. The laser repetition frequency, the laser beam waist diameter and the laser pulse energy are adjusted, and the shaped femtosecond laser is focused on a surface of the sample via a light path built by means of the optical elements of the present application, thereby realizing the processing of a high-quality, non-contact, high efficiency, large-area micro-hole array on various materials, and achieving high repeatability and flexibility.

The femtosecond laser system for processing the micro-hole array can avoid beam split uniformity which is caused by the Gaussian distribution of the laser when applied to the processing of the micro-holes in the array, thus improving uniformity and quality of the micro-holes in the array. In the femtosecond laser system of the present disclosure, the number and the distribution of the micro-holes in the array can be controlled by changing the phase loaded by the spatial light modulator, without arrangement of a complex structure such as consisting of multiple components, and thus the system of the present disclosure has a high adjustability. Moreover, the femtosecond laser system for processing the micro-hole array of the present disclosure is based on spatial beam shaping. By the spatial light shaping, high-precision micro-holes in the array can be processed at one time, thus improving efficiency and avoiding positioning errors of the micro-holes caused by the mechanical structure.

The femtosecond laser system for processing the micro-hole array based on the spatial beam shaping of the present disclosure will be described with reference to the accompanying drawings.

FIG. 1 is a schematic diagram showing a femtosecond laser system for processing a micro-hole array according to an embodiment of the present disclosure. As shown in FIG. 1, the femtosecond laser system for processing the micro-hole array includes a femtosecond laser 1, a half-wave plate 2, a polarizer 3, a concave lens 4, a convex lens 5, a diaphragm 6, a mechanical shutter 7, a phase-type spatial light modulator 8, a first plano-convex lens 9, a reflecting mirror 10, a second plano-convex lens 11, a dichroic mirror 12, a camera 13, a processing objective lens 14, a sample to be processed 15, a six-axis translation stage 16, and a transmissive white light source 17. The femtosecond laser 1, the half-wave plate 2, the polarizer 3, the concave lens 4, the convex lens 5, the diaphragm 6 and the mechanical shutter 7 are sequentially arranged on a first optical axis. The mechanical shutter 7 is configured to control a femtosecond laser beam to be incident on the phase-type spatial light modulator 8 to generate a spatially shaped femtosecond laser pulse. The spatially shaped femtosecond laser pulse sequentially passes through the first plano-convex lens 9, the reflecting mirror 10, the second plano-convex lens 11 and the dichroic mirror 12 to reach the processing objective lens 14, and is focused by the processing objective lens 14 to be irradiated on the sample 15 disposed on the six-axis translation stage 16 to form the micro-hole array.

The half-wave plate 2 and the polarizer 3 together constitute an energy adjustment system, and this energy adjustment system is configured to adjust energy of the femtosecond laser and make a polarization direction of the emitted femtosecond laser beam horizontal. The phase-type spatial light modulator 8 is configured to perform phase modulation to the femtosecond laser beam according to a phase diagram of the micro-hole array of the sample 15.

The concave lens 4, the convex lens 5 and the diaphragm 6 together constitute a beam expansion system, and this beam expansion system is configured to adjust a beam waist diameter of the laser beam. A front focus of the concave lens 4 and a front focus of the convex lens 5 coincide with each other.

The dichroic mirror 12, the camera 13 located at one side of the dichroic mirror 12, and the transmissive white light source 17 constitute a front imaging unit, and this front imaging unit is configured to acquire an image of the micro-hole array processed by the femtosecond laser.

The phase-type spatial light modulator 8, the first plano-convex lens 9, the second plano-convex lens 11, and the processing objective lens 14 together constitute a 4F system. In this 4F system, a focal length of the first plano-convex lens 9 is the same as that of the second plano-convex lens 11, a distance between the first plano-convex lens 9 and the second plano-convex lens 11 is twice as long as the focal length, a distance between the first plano-convex lens 9 and a liquid crystal screen of the phase-type spatial light modulator 8 is equal to the focal length, and a distance between the second plano-convex lens 11 and the processing objective lens 14 is equal to the focal length. With the 4F system, no diffraction effect happens in a light field, modulated by the phase-type spatial light modulator, through the 4F system to the processing objective lens 14.

In the femtosecond laser system for processing the micro-hole array of the present disclosure, the femtosecond laser has a repetition frequency of 10 to 1000 Hz, a single pulse energy of 20 to 200 μJ, and a beam waist diameter before focusing of 4 to 12 mm.

The femtosecond laser system for processing the micro-hole array provided in embodiments of the present disclosure works as follows. The phase-type spatial light modulator 8 is phase-set according to phase of the micro-hole array. A loading phase of the spatial light modulator is set as a specific phase that splits a single laser beam into multiple beams. The number of pulses can be adjusted by setting the laser pulse repetition frequency in combination with the control of the mechanical shutter to control processing parameters such as depth of the micro-holes. A single pulse energy is preset to allow laser energy density not exceed a threshold of the spatial light modulator and reach a threshold of processing the sample material. By adjusting the beam waist before focusing, a size of a hole of the array can be controlled. A femtosecond laser light field for spatial shaping and processing the micro-hole array is generated according to preset parameters and is focused on a surface of the sample to be processed to realize the processing of the micro-holes under the control of the mechanical shutter.

The present disclosure will be further described with reference to the drawings and examples below.

In the following examples of the present disclosure, the femtosecond laser used is a titanium sapphire femtosecond laser from Coherent, with a center wavelength of 800 nm, a pulse width of 35 fs, a repetition frequency of up to 1000 Hz, a maximum single pulse energy of 7 mJ, and a Gaussian light field distribution. The spatial light modulator (SLM) used is a Pluto-2 model from Holoeye. Repetitive positioning accuracies of x, y and z axes of the six-axis translation stage used are respectively ±0.5 μm, ±0.5 μm and ±0.2 μm. The camera used is an industrial-grade CCD.

Example 1: Micro-Holes Distributed Equidistantly are Obtained by Femtosecond Laser Space Shaping, and a Central Angle Interval Between Centers of Two Adjacent Micro-Holes is 60°

Figure 2:
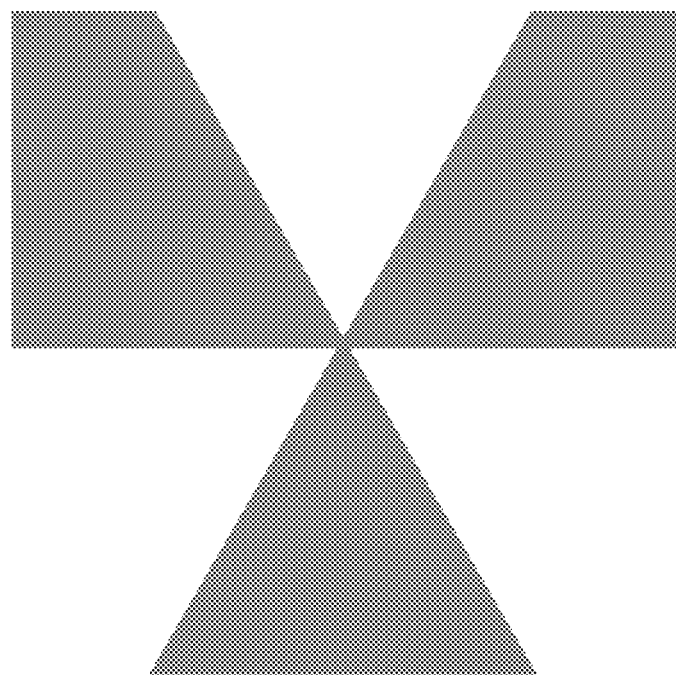
FIG. 2 is a phase image of a spatial light modulator according to Example 1 of the present disclosure.
Figure 3:
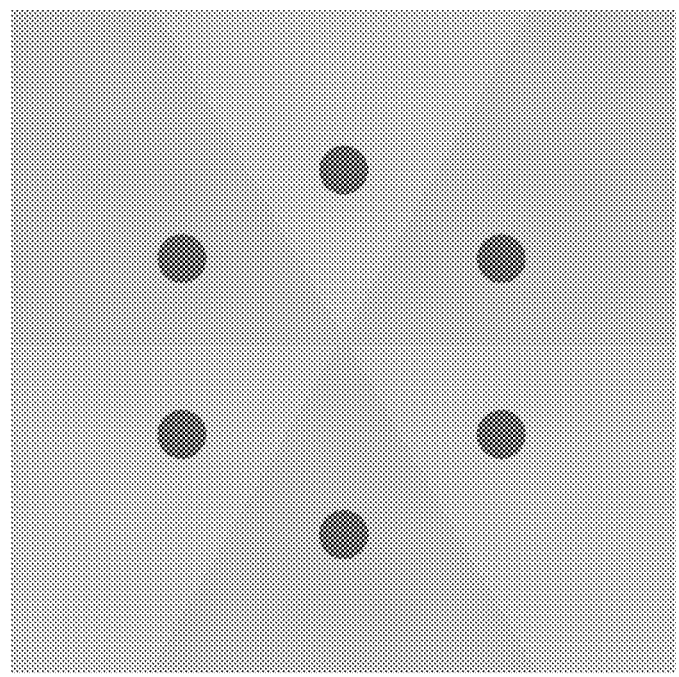
FIG. 3 is an image showing an array processed by Example 1.

The femtosecond laser 1 was turned on and stood for 20 to 30 min to allow the femtosecond laser to emit a stable beam. Optical components were selected and arranged in a specific manner as shown in FIG. 1. Alignment calibration was performed until the laser beam could irradiate on a sample without focusing. The femtosecond laser 1 was set to have a pulse repetition frequency of 100 Hz, and a beam waist diameter before laser focusing of 7 mm. Under operation of a control program of the six-axis translation stage 16, a focal plane of the processing objective lens 14 was determined at the end of the processing optical path, and phases of micro-holes corresponding to the regular hexagonal distribution as shown in FIG. 2 were loaded on the phase-type spatial light modulator 8. Energy of the femtosecond laser was adjusted to 100 μJ by a combination of the half-wave plate 2 and the polarizer 3. A light field of the shaped femtosecond laser, i.e., the split beams was transported to the processing objective lens 14 by the "4F system" without diffraction, and focused on the surface of the sample 15 on the six-axis translation stage 16. At the same time, the transmissive white light source 17 and the camera 13 were used for imaging and observation. The mechanical shutter 7 was set to have an opening time of 1000 ms, and for each position, 100 pulses were used for processing, and the micro-hole array was processed when the mechanical shutter 7 was turned on. The micro-holes formed were observed as shown in FIG. 3. The six-axis translation stage 16 was controlled to change of position of the sample for subsequent processing of micro-holes in the array.

Example 2: Micro-Holes Distributed Equidistantly are Obtained by Femtosecond Laser Space Shaping, and a Central Angle Interval Between Centers of Two Adjacent Micro-Holes is 45°

Figure 4:
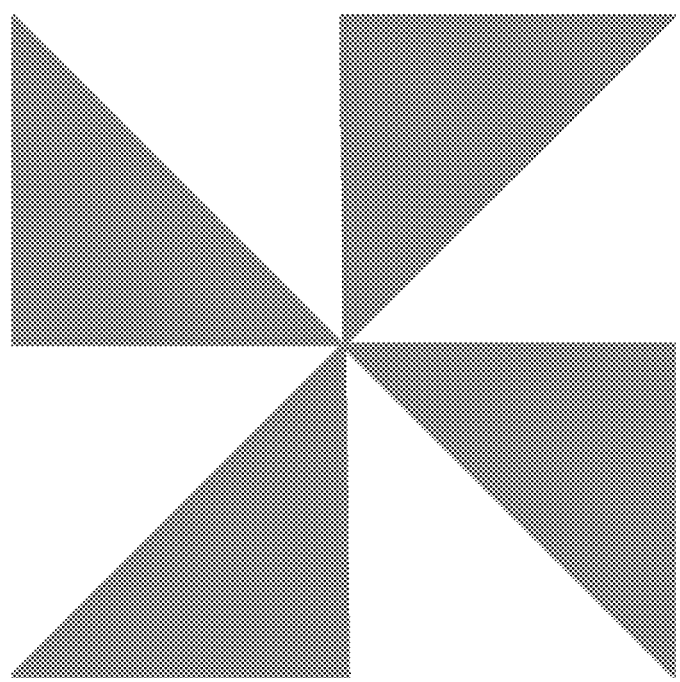
FIG. 4 is a phase image of a spatial light modulator according to Example 2 of the present disclosure.
Figure 5:
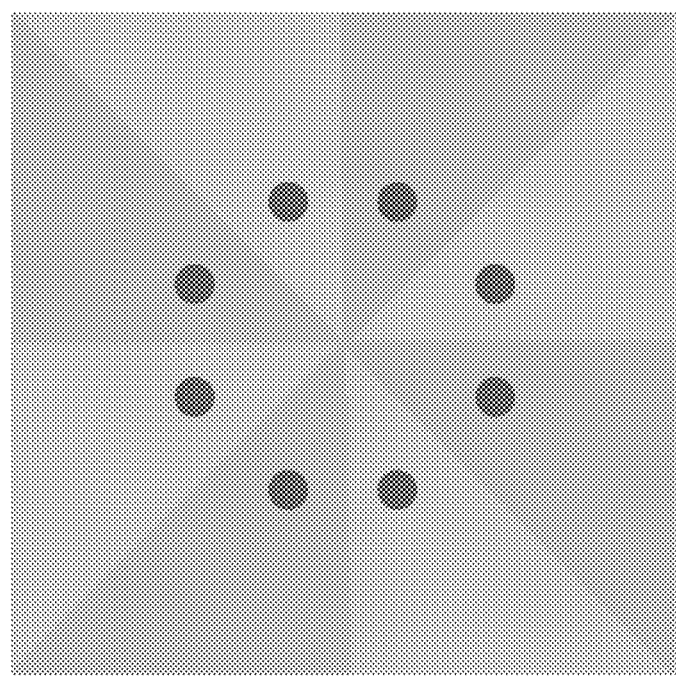
FIG. 5 is an image showing an array processed by Example 2.

The femtosecond laser 1 was turned on and stood for 20 to 30 min to allow the femtosecond laser to emit a stable beam. Optical components were selected and arranged in a specific manner as shown in FIG. 1. Alignment calibration was performed until the laser beam could irradiate on a sample without focusing. The femtosecond laser 1 was set to have a pulse repetition frequency of 200 Hz, and a beam waist diameter before laser focusing of 7 mm. Under operation of a control program of the six-axis translation stage 16, a focal plane of the processing objective lens 14 was determined at the end of the processing optical path, and phases of micro-holes corresponding to the regular octagon distribution as shown in FIG. 4 were loaded on the phase-type spatial light modulator 8. Energy of the femtosecond laser was adjusted to 100 μJ by a combination of the half-wave plate 2 and the polarizer 3. A light field of the shaped femtosecond laser, i.e., the split beams was transported to the processing objective lens 14 by the "4F system" without diffraction, and focused on the surface of the sample 15 on the six-axis translation stage 16. At the same time, the transmissive white light source 17 and the camera 13 were used for imaging and observation. The mechanical shutter 7 was set to have an opening time of 500 ms, and for each position, 100 pulses were used for processing, and the micro-hole array was processed when the mechanical shutter 7 was turned on. The micro-holes formed were observed as shown in FIG. 5. The six-axis translation stage 16 was controlled to change of position of the sample for subsequent processing of micro-holes in the array.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A femtosecond laser system for processing a micro-hole array, comprising: a femtosecond laser, a half-wave plate, a polarizer, a concave lens, a convex lens, a diaphragm, a mechanical shutter, a phase-type spatial light modulator, a first plano-convex lens, a reflecting mirror, a second plano-convex lens, a dichroic mirror, a camera, a processing objective lens, a six-axis translation stage and a transmissive white light source;

wherein the femtosecond laser, the half-wave plate, the polarizer, the concave lens, the convex lens, the diaphragm and the mechanical shutter are sequentially arranged on a first optical axis;

wherein the mechanical shutter is configured to control a femtosecond laser beam to be incident on the phase-type spatial light modulator to generate a spatially shaped femtosecond laser pulse;

wherein the spatially shaped femtosecond laser pulse sequentially passes through the first plano-convex lens, the reflecting mirror, the second plano-convex lens and the dichroic mirror to reach the processing objective lens, and is focused by the processing objective lens to be irradiated on a sample to be processed on the six-axis translation stage to form the micro-hole array for the sample;

wherein the half-wave plate and the polarizer together constitute an energy adjustment system for adjusting energy of the femtosecond laser and making a polarization direction of the emitted femtosecond laser beam horizontal;

wherein the phase-type spatial light modulator is configured to perform phase modulation to the femtosecond laser beam according to a phase diagram of the micro-hole array of the sample;

wherein the concave lens, the convex lens and the diaphragm together constitute a beam expansion system for adjusting a beam waist diameter of the femtosecond laser beam, wherein a front focus of the concave lens and a front focus of the convex lens coincide with each other;

wherein the dichroic mirror, the camera located at one side of the dichroic mirror, and the transmissive white light source constitute a front imaging unit for acquiring an image of the micro-hole array processed by the femtosecond laser;

wherein the phase-type spatial light modulator, the first plano-convex lens, the second plano-convex lens, and the processing objective lens together constitute a 4F system, and the 4F system is configured to prevent diffraction effect from happening in a light field modulated by the phase-type spatial light modulator before reaching the processing objective lens, wherein a focal length of the first plano-convex lens is same as that of the second plano-convex lens, a distance between the first plano-convex lens and the second plano-convex lens is twice as long as the focal length, a distance between the first plano-convex lens and a liquid crystal screen of the phase-type spatial light modulator is equal to the focal length, and a distance between the second plano-convex lens and the processing objective lens is equal to the focal length; and wherein the femtosecond laser has a beam waist diameter before focusing of 4 to 12 mm.

2. The femtosecond laser system for processing the micro-hole array according to claim 1, wherein the femtosecond laser is a titanium sapphire femtosecond laser.

3. The femtosecond laser system for processing the micro-hole array according to claim 1, wherein the femtosecond laser has a pulse repetition frequency of 10 to 1000 Hz.

4. The femtosecond laser system for processing the micro-hole array according to claim 1, wherein the femtosecond laser has a single pulse energy of 20 to 200 µJ.

5. The femtosecond laser system for processing the micro-hole array according to claim 1, wherein the femtosecond laser has a center wavelength of 800 nm and a pulse width of 35 fs.

6. The femtosecond laser system for processing the micro-hole array according to claim 1, wherein the camera is an industrial-grade CCD.

7. The femtosecond laser system for processing the micro-hole array according to claim 1, wherein the femtosecond laser has a pulse repetition frequency of 10 to 200 Hz.

8. The femtosecond laser system for processing the micro-hole array according to claim 1, wherein the femtosecond laser has a single pulse energy of 100 to 200 µJ.

* * * * *